United States Patent
Falahati et al.

(10) Patent No.: US 11,943,773 B2
(45) Date of Patent: Mar. 26, 2024

(54) SYSTEM AND METHOD OF TRANSMITTING SR ON PUCCH IN NR

(71) Applicant: Telefonaktiebolaget LM Ericsson (publ), Stockholm (SE)

(72) Inventors: Sorour Falahati, Stockholm (SE); Robert Baldemair, Solna (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 18 days.

(21) Appl. No.: 16/971,954

(22) PCT Filed: Feb. 22, 2019

(86) PCT No.: PCT/EP2019/054421
§ 371 (c)(1),
(2) Date: Aug. 21, 2020

(87) PCT Pub. No.: WO2019/162430
PCT Pub. Date: Aug. 29, 2019

(65) Prior Publication Data
US 2020/0396758 A1 Dec. 17, 2020

Related U.S. Application Data

(60) Provisional application No. 62/634,080, filed on Feb. 22, 2018.

(51) Int. Cl.
*H04W 72/21* (2023.01)
*H04L 1/1607* (2023.01)

(52) U.S. Cl.
CPC .......... *H04W 72/21* (2023.01); *H04L 1/1671* (2013.01)

(58) Field of Classification Search
USPC ........................................................ 370/329
See application file for complete search history.

(56) References Cited

U.S. PATENT DOCUMENTS

2018/0359149 A1* 12/2018 Shaheen ........... H04W 72/0453
2019/0207737 A1*  7/2019 Babaei .................. H04L 5/0098
(Continued)

OTHER PUBLICATIONS

Ericsson, "On PUCCH Remaining Issues", 3GPP TSG RAN WG1 Meeting#92, Feb. 26-Mar. 2, 2018, pp. 1-10, Athens, Greece, R1-1802907.

(Continued)

*Primary Examiner* — Jeffrey M Rutkowski
*Assistant Examiner* — Luna Weissberger
(74) *Attorney, Agent, or Firm* — COATS & BENNETT, PLLC

(57) ABSTRACT

In New Radio, NR, when a SR PUCCH resource to which a triggered SR is mapped overlaps with a PUCCH carrying UCI, such as HARQ-ACK and/or CSI, an indication of the corresponding schedulingRequestID, which determines the logical channel ID with new data, is directly encoded in the UCI. That is, rather than directly transmit the relevant SR PUCCH resource(s), which indirectly identifies the SR ID, an indication of the SR ID is directly transmitted on the PUCCH transmission. The encoding of an indication of SR ID may comprise adding bits to UCI to be transmitted, for PUCCH formats 2, 3, or 4. For PUCCH format 0, encoding the indication of SR ID comprises adding an initial cyclic offset indicating the triggered SR.

23 Claims, 16 Drawing Sheets

(56) References Cited

U.S. PATENT DOCUMENTS

2019/0230690 A1* 7/2019 Akkarakaran ........ H04W 72/21
2019/0380153 A1* 12/2019 Damnjanovic ....... H04L 5/0044
2020/0288494 A1* 9/2020 Heo ..................... H04W 72/20
2020/0374085 A1* 11/2020 Yin ...................... H04L 5/0055

OTHER PUBLICATIONS

Nokia et al., "Remaining open items on short PUCCH", 3GPP TSG RAN WG1 Meeting #92, Feb. 26-Mar. 2, 2018, pp. 1-3, Athens, Greece, R1-1802023.

Sharp, "Remaining issues for HARQ-ACK transmission overlapping with multiple SR transmission", 3GPP TSG RAN WG1 Meeting #92, Feb. 26-Mar. 2, 2018, pp. 1-7, Athens, Greece, R1-1802665.

* cited by examiner

A) PUCCH format 0 for 2 HARQ-ACK bits
- Only HARQ-ACK using initial CS
- HARQ-ACK/SR, using initial CS incremented by one (i.e., mcs=1)

B) PUCCH format 0 for 1 HARQ-ACK bit
- Only HARQ-ACK using initial CS
- HARQ-ACK/SR, using initial CS incremented by one (i.e., mcs=3)

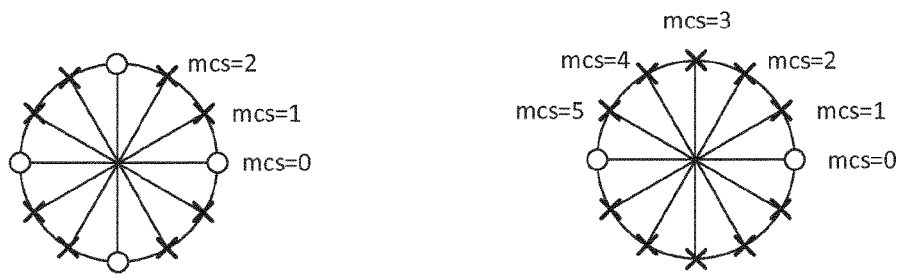

A) PUCCH format 0 for 2 HARQ-ACK bits
- Only HARQ-ACK using initial CS
- HARQ-ACK/SR, using initial CS incremented by X for Xth SR configuration (i.e., mcs=X)
- Maximum 2 SR configurations can overlap with HARQ-ACK PUCCH format 0 resource B) PUCCH format 0 for 1 HARQ-ACK bit
- Only HARQ-ACK using initial CS
- HARQ-ACK/SR, using initial CS incremented by X for Xth SR configuration (i.e., mcs=X)
- Maximum 5 SR configurations can overlap with HARQ-ACK PUCCH format 0 resource Figure 3
(prior art)

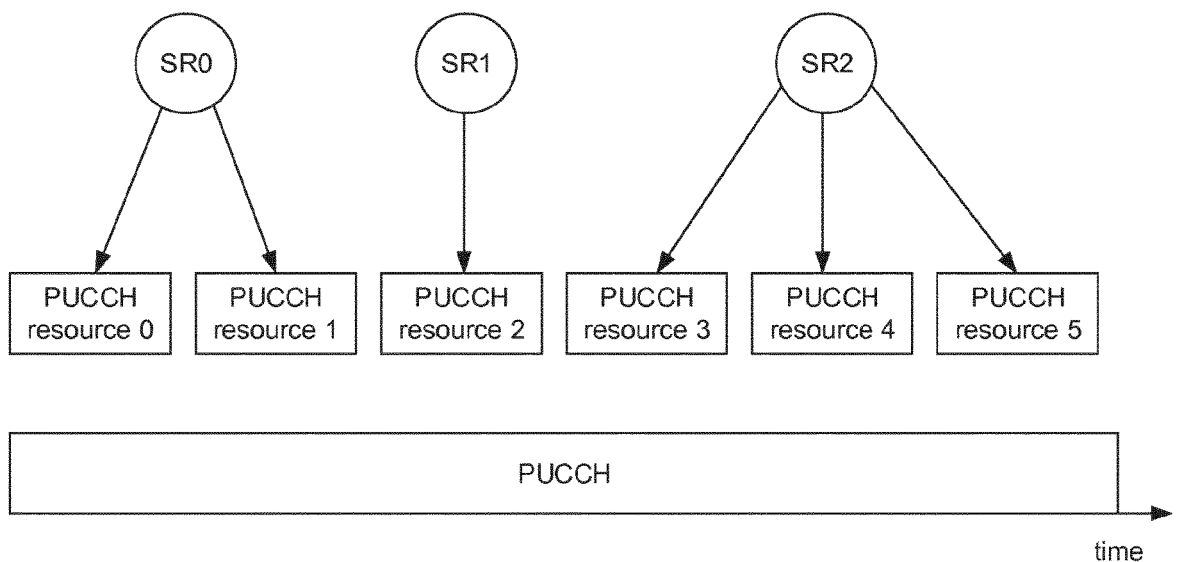

Figure 4
(prior art)

SYSTEM AND METHOD OF TRANSMITTING SR ON PUCCH IN NR

RELATED APPLICATIONS

This application claims priority to U.S. Prov. Pat. App. Ser. No. 62/634,080, filed Feb. 22, 2018, titled "Overlapping PUCCH and SR," the disclosure of which is incorporated herein by reference in its entirety.

TECHNICAL FIELD

The present invention relates generally to wireless communications, and in particular to a system and method of efficiently communicating Scheduling Requests from a wireless device to a node in a wireless communication network.

BACKGROUND

Wireless communication networks are ubiquitous in many parts of the world, and continue to advance—in geographical footprint, number of subscribers, data rates, and services supported. As the technology continues to evolve, technical and operational standards are adopted that ensure interoperability of heterogeneous equipment. The Third Generation Partnership Project (3GPP) defined and published standards for third generation (3G) wireless communications (e.g., Universal Mobile Telecommunications Service, or UMTS, and advanced Code Division Multiple Access, or CDMA2000) and fourth generation (4G) systems (e.g., Long Term Evolution, or LTE and WiMAXX). Work is ongoing to define the fifth generation (5G), known as New Radio (NR). NR system will incorporate numerous advanced mobile telecomm technologies, including beamforming, massive Multiple Input-Multiple Output (MIMO), heterogeneous networks (het-nets), machine-type communications (MTC), and vastly expanded frequency ranges.

In NR, the network access node (also known as base station) is referred to as gNB. Mobile communication terminals are referred to as User Equipment (UE). This terminology is adopted herein.

PUCCH Formats in NR

New Radio (NR), the 3GPP fifth-generation (5G) wireless communication standard, supports five different Physical Uplink Control Channel (PUCCH) formats.

PUCCH Format 0

PUCCH format 0 can be one or two symbols long (with or without frequency-hopping) and can carry one or two bit ACK/NACK, together with at most two Scheduling Request (SR) bits. This format uses sequence selection, i.e., the Uplink Control Information (UCI) bit(s) select one out of N sequences where N is determined by the number of UCI bits to transmit. PUCCH format 0 is always one Physical Resource Block (PRB) wide.

PUCCH Format 1

PUCCH format 1 can be four to 14 symbols long (with or without frequency-hopping) and can carry one or two bit ACK/NACK bits. Besides its length, variability is very similar to PUCCH format 1a/1b in LTE. If ACK/NACK should be transmitted simultaneously with SR, the PUCCH transmissions occurs not on the ACK/NACK resource but on a Radio Resource Control (RRC) configured SR resource. PUCCH format 1 is always one PRB wide.

PUCCH Format 2

PUCCH format 2 can be one or two symbols long (with or without frequency-hopping) and can carry three or more (up to several tens) ACK/NACK bits, together with CSI and SR, if configured. PUCCH format 2 encodes the UCI information and transmits the encoded UCI over subcarriers of one or two OFDM symbols. To accommodate larger payloads, PUCCH format 2 can extend over multiple PRBs.

PUCCH Format 3

PUCCH format 3 can be four to 14 symbols long (with or without frequency-hopping) and can carry three to a few hundred bits, together with CSI and SR, if configured. PUCCH format 3 encodes the UCI bits, maps it to complex QPSK symbols, splits the symbol sequence into one part for each OFDM symbol carrying UCI, and applies DFTS-OFDM precoding prior to OFDM modulation. PUCCH format 3 offers the largest payloads size across all NR PUCCH formats. To accommodate larger payloads, PUCCH format 3 can extend over multiple PRBs.

PUCCH Format 4

PUCCH format 4 can be four to 14 symbols long (with or without frequency-hopping) and can carry three to a several tens of bits, together with CSI and SR, if configured. PUCCH format 4 is very similar to PUCCH format 3, with two exceptions: it can multiplex up to four users on the same time-frequency resource by using OCC multiplexing prior to DFTS-OFDM precoding, and it is restricted to a single PRB.

Scheduling Request (SR)

In NR, the network controls all traffic across the air interface, with the exception of initial access by UEs, such as via Random Access procedures. In particular, when a UE has data to transmit in the uplink, it sends a Scheduling Request (SR) to the network indicating, e.g., the logical channel generating the request (which inherently communicates the priority), the amount of data to be transmitted, and the like. Scheduling Requests are part of Uplink Control Information (UCI). The network then allocates time-frequency resources to the requesting UE, and communicates these to the UE in Downlink Control Information (DCI). At the allocated time, the UE transmits its uplink data on the allocated resources. Because the network controls all traffic in this manner, there is no collision of uplink data from different UEs to the same network node; hence, the communications have low interference and can use the minimum required transmission power.

Each UE can be configured with one or multiple Scheduling Request configurations (up to 8) per cell group. The RRC information element SchedulingRequestResourceConfig associates a schedulingRequestID with a SchedulingRequestResourceId. The SchedulingRequestResourceId identifies the physical resource (i.e., PUCCH) as well as periodicity and offset. The SchedulingRequestID is associated with a logical channel; if a logical channel requires UL resources, the associated scheduling request with schedulingRequestID is triggered. Note that a scheduling request ID schedulingRequestID can be mapped to multiple PUCCH resources, i.e., there can be several SchedulingRequestResourceConfig that map/link to the same schedulingRequestID. Hence the ID space of SchedulingRequestResourceConfig can be larger or equal to the ID space of the schedulingRequestID.

FIG. 1 shows the case where one scheduling request ID schedulingRequestID is mapped to multiple PUCCH resources corresponding to multiple SchedulingRequestResourceConfig configurations.

Collision Between SR and PUCCH Format 2, 3, or 4

In case a PUCCH transmission (of format 2, 3, or 4) overlaps one or multiple (K) Scheduling Request PUCCH resources, X bits are added to the UCI carrier on PUCCH to indicate which Scheduling Request PUCCH resource is associated with a triggered Scheduling Request.

Solutions currently under discussion are to have a bitmap of size K, i.e., X=K, and each bit in the bitmap is associated with one of the overlapped PUCCH resources used for Scheduling Request. Each PUCCH resource is, in turn, mapped (perhaps non-exclusively) to a Scheduling Request ID. Hence, the X bits added to UCI only indirectly identify a triggered SR.

Another solution is to use X=ceil($\log_2$(K+1)) to indicate one of the K overlapped PUCCH resources used for Scheduling Request. The additional codepoint "+1" is needed to indicate if no Scheduling Request has been triggered on any of the K PUCCH resources. Here again, a triggered SR is indirectly identified, via (one of) its associated SR PUCCH resource(s).

Collision Between SR and PUCCH Format 0

In case a PUCCH format 0 overlaps with one Scheduling Request PUCCH resource, the triggered SR is indirectly conveyed with HARQ-ACK, by increasing the initial cyclic shift of the HARQ-ACK sequences in the corresponding PUCCH format 0 resource, as shown in FIG. 2.

In a case a PUCCH format 0 overlaps with one or multiple (K) Scheduling Request PUCCH resources, two additional cyclic shifts can be used for two HARQ-ACK bits, and five more for one-bit HARQ-ACK, as shown in FIG. 3. This means format 0 can indirectly convey, with one or two HARQ-ACK bits, a maximum of two triggered SR.

Solutions to the following challenges are currently being discussed:

1) how to avoid overlapping more than one configured SR PUCCH resource with a PUCCH format 0 transmission for HARQ-ACK;
2) how to restrict the configuration of SR PUCCH resources to maximum two SR PUCCH resources that can overlap with a PUCCH format 0 transmission for HARQ-ACK bits; and
3) how to transmit only one triggered SR if any of the configured SR PUCCH resources overlap with a PUCCH format 0 transmission for HARQ-ACK bits.

A scheduling request schedulingRequestID can be mapped to multiple configured PUCCH resources at the physical layer, as depicted in FIG. 1. If multiple PUCCH resources associated with the same schedulingRequestID overlap a PUCCH transmission, it is unnecessary overhead to count all of the overlapping PUCCH resources, since all PUCCH resources carry the same information (logical channel associated with schedulingRequestID) and only one of them would be triggered.

FIG. 4 depicts an example where three SRs are mapped to six PUCCH resources. In this case, for format 2, 3, or 4, the number of bits X added to UCI transmitted on PUCCH would be either 6 (bitmap) or 3 (K=ceil( ) even though only three schedulingRequestID can be triggered at most. An indication of the highest priority triggered SR (or the case that none of them is triggered) should require only two bits.

In the case of PUCCH format 0, only one schedulingRequestID could be triggered (for example SR 0), if SR PUCCH resource 0 and 1 both overlap with PUCCH format 0. Note that in FIG. 4, all PUCCH resources are shown non-overlapping; however, this is not necessarily the case.

In either case—whether the PUCCH is of format 0 or of format 2, 3, or 4—the SR ID is only indirectly identified. The PUCCH directly identifies the SR PUCCH resources, each of which is mapped (perhaps non-exclusively) to a SR ID. The SR ID, in turn, identifies a logical channel with data to transmit. However, since a single SR ID may be mapped to multiple SR PUCCH resources, as depicted in FIG. 4, directly identifying the SR PUCCH resources in the PUCCH transmission requires, at best, the same number, and in general, more bits than are required to uniquely identify the triggered SR ID(s).

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention disclosed and claimed herein, when a SR PUCCH resource to which a triggered SR is mapped overlaps with a PUCCH carrying UCI, such as HARQ-ACK and/or CSI, an indication of the corresponding schedulingRequestID, which determines the logical channel ID with new data, is directly encoded in the UCI. That is, rather than directly transmit the relevant SR PUCCH resource(s), which indirectly identifies the SR ID, an indication of the SR ID is directly transmitted on the PUCCH transmission. The encoding of an indication of SR ID may comprise adding bits to UCI to be transmitted, for PUCCH formats 2, 3, or 4. For PUCCH format 0, encoding the indication of SR ID comprises adding an initial cyclic offset indicating the triggered SR.

One embodiment relates to a method, performed by a wireless device, of uplink control signaling to a network node in a wireless communication network. A Scheduling Request corresponding to a logical channel having data to transmit is triggered. A Scheduling Request ID associated with the logical channel is mapped to one or more PUCCH resources. If a mapped SR PUCCH resource overlaps with a PUCCH carrying UCI, an indication of the Scheduling Request ID is encoded directly in the UCI, and the UCI, including the Scheduling Request ID indication, is transmitted to the network node, on the PUCCH.

Another embodiment relates to a wireless device operative to perform uplink control signaling to a network node in a wireless communication network. The wireless device includes communication circuitry and processing circuitry operatively connected to the communication circuitry. The processing circuitry is adapted to trigger a Scheduling Request corresponding to a logical channel having data to transmit, and map a Scheduling Request ID associated with the logical channel to one or more PUCCH resources. If a mapped SR PUCCH resource overlaps with a PUCCH carrying UCI, an indication of the Scheduling Request ID is encoded directly in the UCI, and the UCI, including the Scheduling Request ID indication, is transmitted to the network node on the PUCCH.

Yet another embodiment relates to a method, performed by a node operative in a wireless communication network, of receiving and processing uplink control signaling from a wireless device. A PUCCH transmission of UCI, including a direct indication of at least one Scheduling Request ID identifying a logical channel having data to transmit, is received from the wireless device. The indication of the Scheduling Request ID is extracted to identify the logical channel.

Still another embodiment relates to a network node operative in a wireless communication network and operative to receive and process uplink control signaling transmitted by a wireless device. The network node includes communication circuitry and processing circuitry operatively connected to the communication circuitry. The processing circuitry is adapted to receive from a mobile device a PUCCH transmission of UCI, including a direct indication of at least one Scheduling Request ID identifying a logical channel having data to transmit; and extract the indication of the Scheduling Request ID to identify the logical channel.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 3 is a constellation diagram showing the use of cyclic shifts to encode PUCCH resource IDs onto PUCCH format 0 for 2-bit and 1-bit HARQ/ACK transmissions.

FIG. 4 is a block diagram showing the mapping of multiple SRs to multiple PUCCH resources.

DETAILED DESCRIPTION

Figure 1:
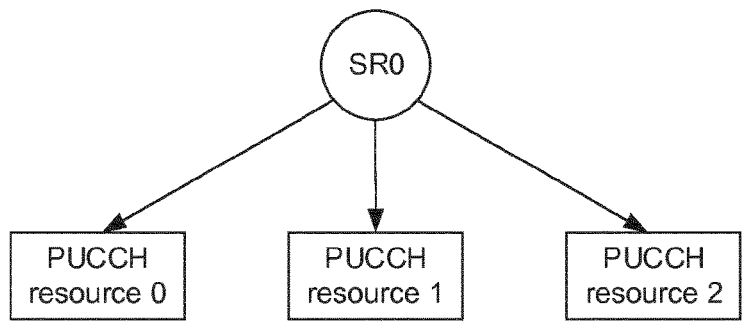
FIG. 1 is a block diagram of mapping of a Scheduling Request to multiple PUCCH resources.
Figure 2:
FIG. 2 is a constellation diagram showing the use of cyclic shifts to encode PUCCH resource IDs onto PUCCH format 0 for 2-bit and 1-bit HARQ/ACK transmissions.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

UCI Transmission Including SR with PUCCH Format 2 or 3 or 4

In one embodiment, for a UCI transmission on PUCCH format 2 or 3 or 4 that overlaps with one of multiple SR PUCCH resources, X bits are added to the UCI carried on PUCCH to indicate which scheduling request ID is triggered. In this embodiment, assume M is the number of configured schedulingRequestIDs at the UE. One method in this embodiment is to use X=M bits in form of bitmap, where each bit in the bitmap is associated with one of the configured scheduling request IDs which maps to a logical channel ID on the MAC layer. The bits corresponding to the schedulingRequestIDs with triggered SR are set to "1" in the bitmap, otherwise zero (or vice versa).

Another method in this embodiment is to use X=ceil(log$_2$ (M+1)) to indicate one of the M configured scheduling request IDs that is triggered if SR is present. The additional codepoint "+1" is needed to indicate if no scheduling request has been triggered on any of the M logical channels. In case multiple SR requests corresponding to multiple logical channels are triggered and report the need to transmit data, the indicated schedulingRequestID corresponding to the logical channel with the highest priority is conveyed by X.

Although multiple triggered SRs may overlap with SR PUCCH resources, not all of these PUCCH resources have transmission occasions in the same slot where the UCI transmission occurs. Accordingly, a more conservative mapping omits the triggered SRs which cannot, in any event, be added to the UCI. In this embodiment, for a UCI transmission on PUCCH format 2 or 3 or 4 that overlaps with one or multiple SR PUCCH resources, X bits are added to the UCI carried on PUCCH to indicate which scheduling request ID is triggered. Assume L is the number of configured schedulingRequestIDs at the UE for which their corresponding configured SR PUCCH resources have transmission occasions in the slot where the UCI transmission on PUCCH format 2 or 3 or 4 occurs (i.e., in total the UE can be configured with more than L schedulingRequestIDs, but only L overlap with the PUCCH transmission). Which L configured scheduling requests (out of all configured schedulingRequestIDs) overlap are known to the gNB. The ordering can be in an increasing ID number or decreasing ID number.

One method in this embodiment is to use X=L bits in form of bitmap, where each bit in the bitmap is associated with one of the L configured scheduling request IDs which maps to a logical channel ID on the MAC layer. The bits corresponding to the schedulingRequestIDs with triggered SR are set to "1" in bitmap, otherwise zero (or vice versa).

Another method in this embodiment is to use X=ceil(log$_2$(L+1)) to indicate one of the L configured scheduling request IDs that is triggered if SR is present. The additional codepoint "+1" is needed to indicate if no scheduling request has been triggered on any of the L logical channels. In case multiple SR requests corresponding to multiple logical channels are triggered and report the incoming of new data, the schedulingRequestID corresponding to the logical channel with the highest priority is conveyed by X.

Figure 5:
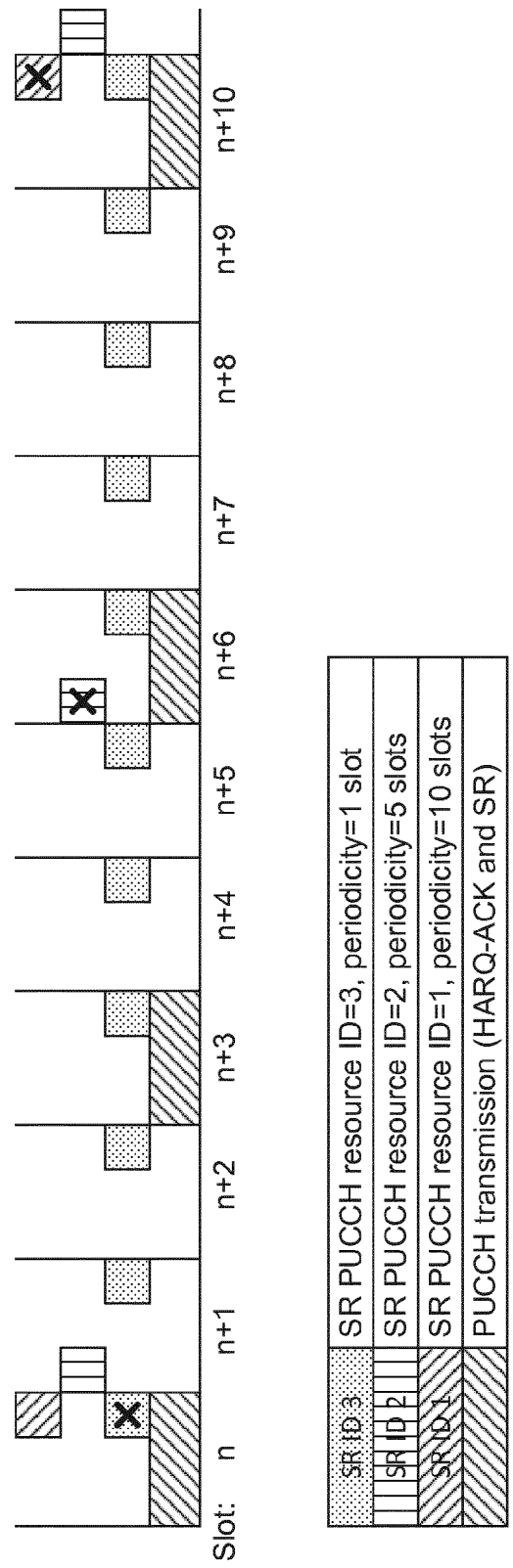
FIG. 5 is a diagram showing SR PURCCH resources and PUCCH transmissions in various slots.

FIG. 5 depicts the operation of the encoding method of these two embodiments (as opposed to the bitmap method), for PUCCH formats 2, 3, or 4. Eleven slots are depicted, ranging from slot n to slot n+10. There are three SR PUCCH resources, each having different periodicities. SR ID 3 has a periodicity of every slot; SR ID 2 has a periodicity of 5 slots (with transmissions in slots n+1, n+6, and n+11); and SR ID 1 has a periodicity of 10 slots (with transmissions in slots n and n+10). UCI transmissions on PUCCH occur in slots n, n+3, n+6, and n+10. However, SRs are triggered only in slots n, n+6, and n+10, as indicated by the "X" in the relevant SR PUCCH resource (corresponding to the relevant SR ID).

Table 1 below depicts the implementation of the encoding method of the two embodiments described above, wherein the number of bits X added to UCI to directly report a SR ID are M and L. Table 1 explicitly indicates the encodings of X in each slot for which a UCI transmission occurs on PUCCH. In each cell, the underlined encoding is the one that would be transmitted for the corresponding situation in FIG. 5.

TABLE 1

Encoding of X added bits for Various Embodiments

| Slot | First Embodiment<br>X = ceil(log2(M + 1)) | Second Embodiment<br>X = ceil(log2(L + 1)) |
|---|---|---|
| n | M = 3, X -> 2 bits<br>X = 00 -> No SR<br>X = 01 -> SR ID = 1<br>X = 10 -> SR ID = 2<br>X = 11 -> SR ID = 3 | L = 2, X -> 2 bits<br>X = 00 -> No SR<br>X = 01 -> SR ID = 1<br>X = 10 -> SR ID = 3<br>X = 11 -> unused |
| n + 3 | M = 3, X -> 2 bits<br>X = 00 -> No SR<br>X = 01 -> SR ID = 1<br>X = 10 -> SR ID = 2<br>X = 11 -> SR ID = 3 | L = 1, X -> 1 bit<br>X = 0 -> No SR<br>X = 1 -> SR ID = 3 |
| n + 6 | M = 3, X -> 2 bits<br>X = 00 -> No SR<br>X = 01 -> SR ID = 1<br>X = 10 -> SR ID = 2<br>X = 11 -> SR ID = 3 | L = 2, X -> 2 bits<br>X = 00 -> No SR<br>X = 01 -> SR ID = 3<br>X = 10 -> SR ID = 2<br>X = 11 -> unused |
| n + 10 | M = 3, X -> 2 bits<br>X = 00 -> No SR<br>X = 01 -> SR ID = 1<br>X = 10 -> SR ID = 2<br>X = 11 -> SR ID = 3 | L = 2, X -> 2 bits<br>X = 00 -> No SR<br>X = 01 -> SR ID = 1<br>X = 10 -> SR ID = 3<br>X = 11 -> unused |

Considering the first embodiment, M=3 for every slot, as there are three SR IDs at the UE. In slot n, the two X bits identify SR ID 3. In slot n+3, the two X bits indicate that no SR is triggered at the UE. In slot n+6, the two X bits identify SR ID 2, and in slot n+10 they identify SR ID 1. If two or more SRs were triggered in the same slot, the X bits would indicate the highest priority among them.

Considering the second embodiment, for slot n, L=2, as there are two SRs triggered in the same slot as a UCI transmission on PUCCH. The two X bits identify SR ID 3 as the only one triggered in that slot. In slot n+3, only one SR PUCCH resource is present in the same slot that UCI is transmitted on PUCCH, therefore L=1 and X is one bit. In this case, the single X bit indicates that no SR is triggered. For both slots n+6 and n+10, two SR PUCCH resources overlap a UCI transmission on PUCCH, and hence L=2 and thus X is two bits in both cases. The encoding of the two X bits—known to both the UE and the gNB—indicates the triggered SR ID, as indicated in FIG. 5. If two or more SRs were triggered in the same slot, the X bits would indicate the highest priority among them. Note that in slot n+3, X=1 in this embodiment, as opposed to X=2 in the first embodiment.

Of course, the particular encodings of X bits in Table 1 are exemplary only. In other implementations, SR IDs could always be assigned the same encoding, for example matching their SR ID.

UCI Transmission Including SR with PUCCH Format 0

In one embodiment, for a UCI transmission on PUCCH format 0 that overlaps with at least one of M SR PUCCH resources, only the two schedulingRequestIDs associated with two logical channels having the highest priority are considered for transmission. If data to be transmitted arrive in the one of these two logical channels with the highest priority, the HARQ-ACK bits are transmitted on PUCCH format 0 resource of the HARQ-ACK-only bits, with the initial cyclic shift being increased by a first amount. For a 2-bit transmission, the cyclic shift is increased by X1 (e.g., X1=1). For a single-bit transmission, the cyclic shift is increased by X2 (e.g., X2=3). If new data arrives in one of these two logical channels having the second priority, the HARQ-ACK bits are transmitted on PUCCH format 0 resource of the HARQ-ACK-only bits with the initial cyclic shift being increased by a second amount. For a 2-bit transmission, the cyclic shift is increased by Y1 (e.g., Y1=2). For a single-bit transmission, the cyclic shift is increased by Y2 (e.g., Y2=4). If both of these logical channels receive new data, only the highest-priority one is assumed for triggering SR, and the cyclic shift increase is X1 or X2.

In another embodiment, for a UCI transmission on PUCCH format 0 that overlaps with at least one of M SR PUCCH resources, the corresponding schedulingRequestIDs and their associated logical channels are partitioned into two groups. One group has a higher priority than the other group. If new data arrives for any of the logical channels in the group with the highest priority, the HARQ-ACK bits are transmitted on PUCCH format 0 resource of the HARQ-ACK-only bits, with the initial cyclic shift being increased by a first amount. For a 2-bit transmission, the cyclic shift is increased by X1 (e.g., X1=1). For a single-bit transmission, the cyclic shift is increased by X2 (e.g., X2=3). If new data arrives in any of the logical channels in the group with the second priority, the HARQ-ACK bits are transmitted on PUCCH format 0 resource of the HARQ-ACK-only bits with the initial cyclic shift being increased by a second amount. For a 2-bit transmission, the cyclic shift is increased by Y1 (e.g., Y1=2). For a single-bit transmission, the cyclic shift is increased by Y2 (e.g., Y2=4). If both of these group have at least one logical channel which receives new data, only the group with highest priority is assumed for triggering SR, and the cyclic shift increase is X1 or X2.

The two groups can be constructed in different ways. In one embodiment, the groups are constructed by ordering the SR ID in increasing order. Each group then includes every other SR ordered ID. In another embodiment, the highest priority SR IDs are collected to form one group, and the lowest priority SR IDs are collected to form the other group. Note, the groups can be the same or different sizes.

If a PUCCH format 0 is configured to only carry one bit, then five cyclic shifts are possible. In this case, the above two embodiments are directly generalized to five schedulingRequestIDs or five groups of schedulingRequestIDs. Another embodiment is shown in Table 2. Here, three different schedulingRequestIDs (or groups thereof) exist, and different combinations of triggered schedulingRequestIDs combinations are mapped to the five code points (five cyclic shifts). In this example, SR ID 2 has highest priority, and SR ID 0 had the lowest priority. A '1' in the table indicates SR has been triggered, '0' indicates not triggered, and X is 'don't care' (i.e., it may be either 0 or 1).

TABLE 2

Mapping of SR IDs to cyclic shifts for PUCCH format 0

| Cyclic shift mcs | SR ID 0 | SR ID 1 | SR ID 2 |
|---|---|---|---|
| 1 | X | 0 | 1 |
| 2 | X | 1 | 0 |
| 3 | 1 | 0 | 0 |
| 4 | 0 | 1 | 1 |
| 5 | 1 | 1 | 1 |

Those of skill in the art may readily device different mappings, given the teachings herein.

In all of the PUCCH format 0 embodiments described herein, the SR IDs are directly indicated, by predetermined cyclic shifts, rather than indirectly indicating the SR IDs by using cyclic shifts to indicate SR PUCCH resources to which SR IDs are mapped.

Methods and Apparatuses

Figure 6:
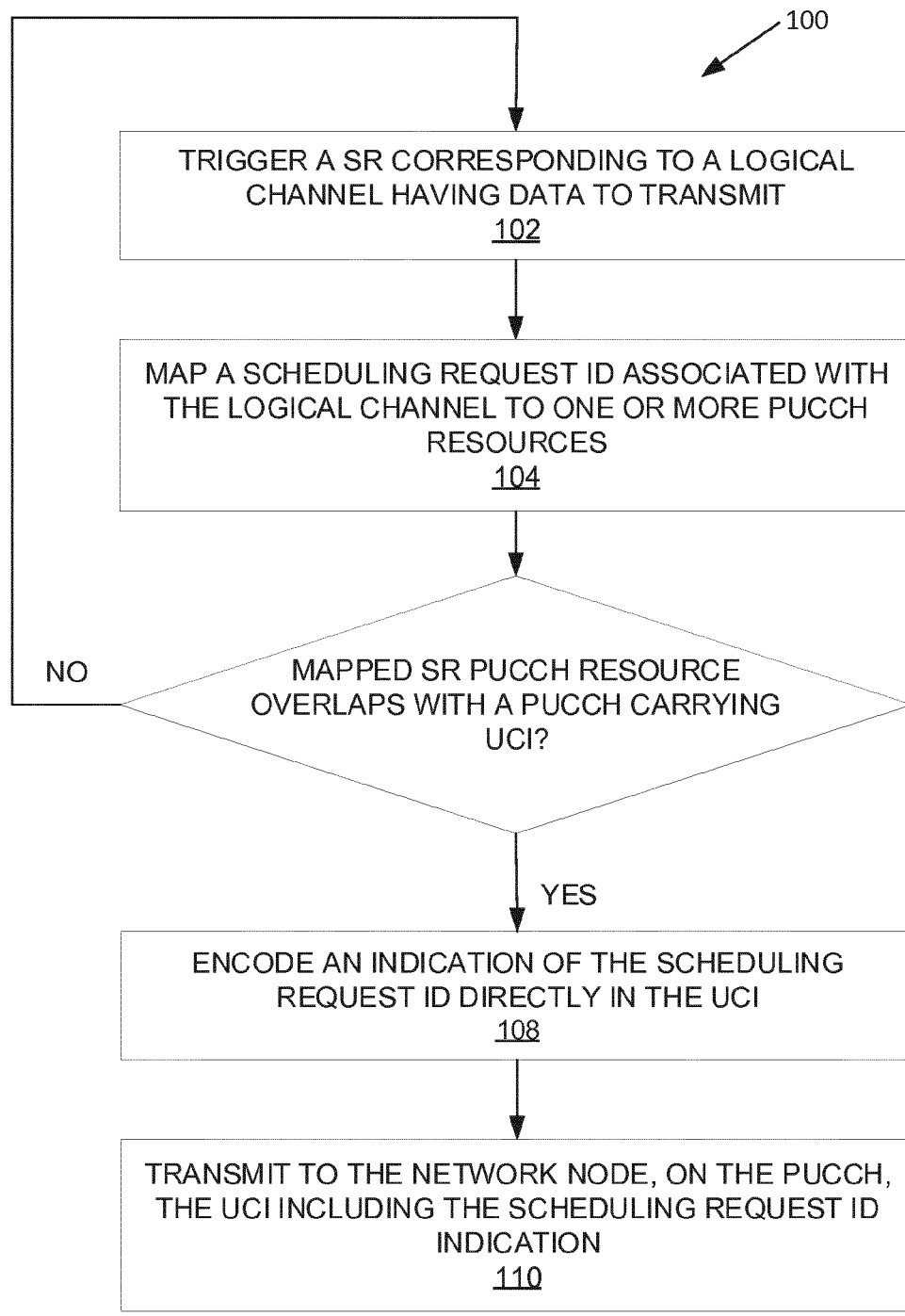
FIG. 6 is a flow diagram of a method, performed by a wireless device, of uplink control signaling to a network node in a wireless communication network.

FIG. 6 depicts a method 100, performed by a wireless device, of uplink control signaling to a network node in a wireless communication network. A Scheduling Request (SR) corresponding to a logical channel having data to transmit is triggered (block 102). A Scheduling Request ID associated with the logical channel is mapped to one or more Physical Uplink Control Channel (PUCCH) resources (block 104). If a mapped SR PUCCH resource overlaps with a PUCCH carrying uplink control information (UCI), an indication of the Scheduling Request ID is encoded directly in the UCI (block 106), and the UCI, including the Scheduling Request ID indication, is transmitted to the network node on the PUCCH (block 108).

Figure 7:
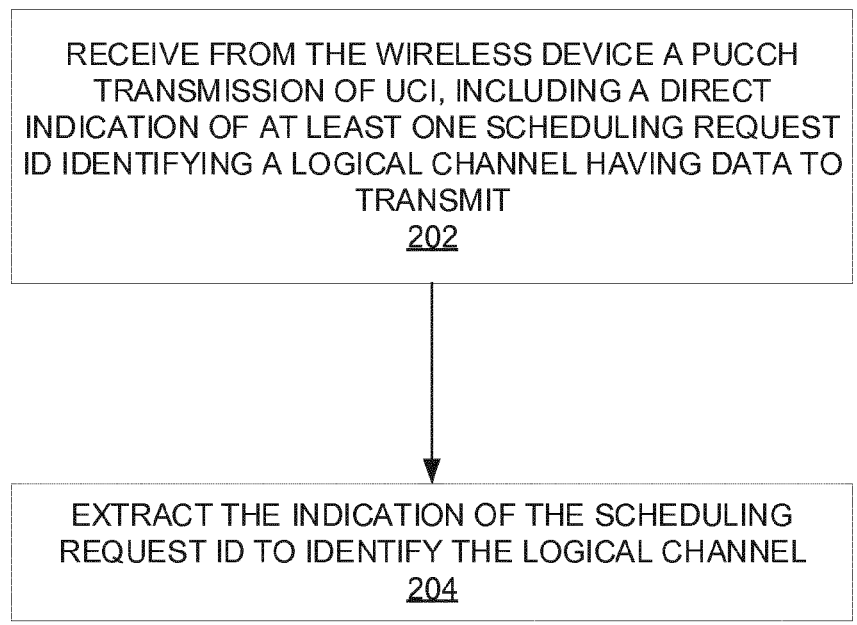
FIG. 7 is a flow diagram of a method, performed by a node operative in a wireless communication network, of receiving and processing uplink control signaling from a wireless device.

FIG. 7 depicts a method 200, performed by a node operative in a wireless communication network, of receiving and processing uplink control signaling from a wireless device. A PUCCH transmission of UCI, including a direct indication of at least one Scheduling Request ID identifying a logical channel having data to transmit, is received from the wireless device (block 202). The indication of the Scheduling Request ID is extracted to identify the logical channel.

The apparatuses described herein may perform the methods 100, 200 herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
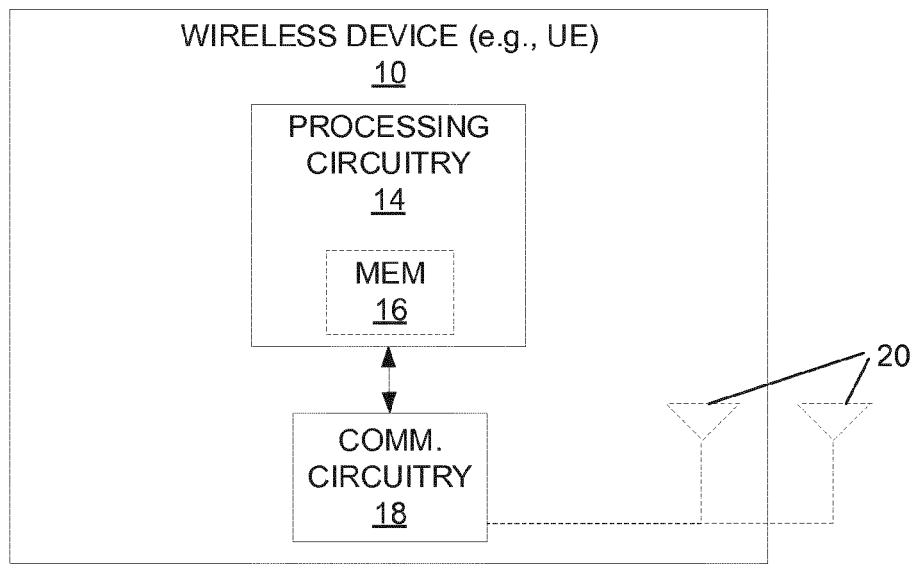
FIG. 8 is a block diagram of a wireless device showing hardware components.

FIG. 8 for example illustrates a wireless device 10 as implemented in accordance with one or more embodiments. A wireless device 10 is any type device capable of communicating with a network node and/or access point using radio signals. A wireless device 10 may therefore refer to a machine-to-machine (M2M) device, a machine-type communications (MTC) device, a Narrowband Internet of Things (NB IoT) device, etc. The wireless device 10 may also be referred to as a User Equipment (UE), such as a cellular telephone or "smartphone," however, the term UE should be understood to encompass any wireless device 10. A wireless device 10 may also be referred to as a radio device, a radio communication device, a wireless device, a wireless terminal, or simply a terminal—unless the context indicates otherwise, the use of any of these terms is intended to include device-to-device UEs or devices, machine-type devices, or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices, although referred to as UEs, but may be configured to transmit and/or receive data without direct human interaction.

In some embodiments, the wireless device 10 includes a user interface, including e.g. a display, touchscreen, keyboard or keypad, microphone, speaker, and the like) (not shown); in other embodiments, such as in many M2M, MTC, or NB IoT scenarios, the wireless device 10 may include only a minimal, or no, user interface. The wireless device 10 also includes processing circuitry 14; memory 16; and communication circuitry 18 connected to one or more antennas 20, to effect wireless communication across an air interface to one or more radio network nodes, such as a base station, and/or access points. As indicated by the dashed lines, the antenna(s) 20 may protrude externally from the wireless device 10, or the antenna(s) 20 may be internal. In some embodiments, a wireless device 10 may additionally include features such as a camera, accelerometer, satellite navigation signal receiver circuitry, vibrating motor, and the like (not depicted in FIG. 8).

According to embodiments of the present invention, the memory 16 is operative to store, and the processing circuitry 14 is operative to execute, software which when executed is operative to cause the wireless device 10 to directly encode at least one Scheduling Request ID into UCI transmitted in the uplink on PUCCH. In particular, the software, when executed on the processing circuitry 14, is operative to perform the method 100 described and claimed herein. The processing circuitry 14 in this regard may implement certain functional means, units, or modules.

Figure 9:
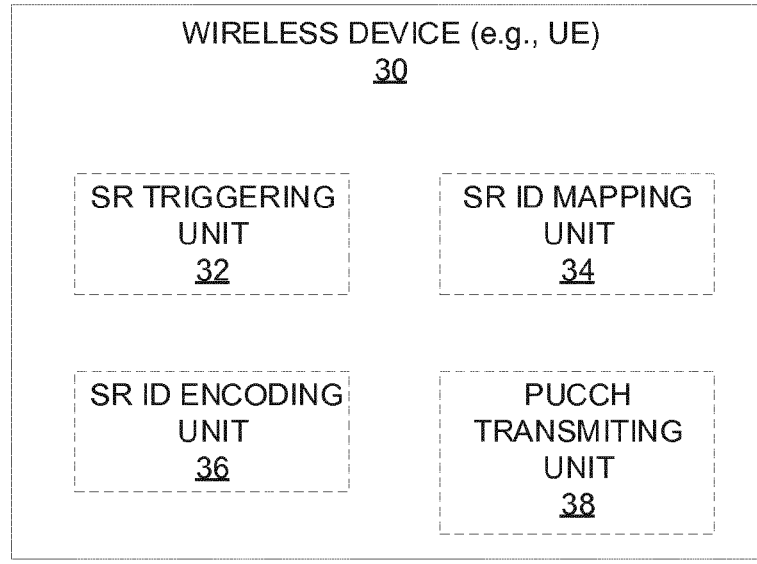
FIG. 9 is a block diagram of a wireless device showing functional units.

FIG. 9 illustrates a schematic block diagram of a wireless device 30 in a wireless network according to still other embodiments. As shown, the wireless device 30 implements various functional means, units, or modules, e.g., via the processing circuitry 14 in FIG. 8 and/or via software code. These functional means, units, or modules, e.g., for implementing the method(s) herein, include for instance: a SR triggering unit 32, a SR ID mapping unit 34, a SR ID encoding unit 36, and a PUCCH transmitting unit 38.

The SR triggering unit 32 is configured to trigger a SR corresponding to a logical channel having data to transmit. The SR ID mapping unit 34 is configured to map a SR ID associated with the logical channel to one or more PUCCH resources. If a mapped SR PUCCH resource overlaps with a PUCCH carrying UCI, the SR ID encoding unit 36 is configured to encode an indication of the SR ID directly in the UCI, and the PUCCH transmitting unit 38 is configured to transmit to the network node, on the PUCCH, the UCI including the SR ID indication.

Figure 10:
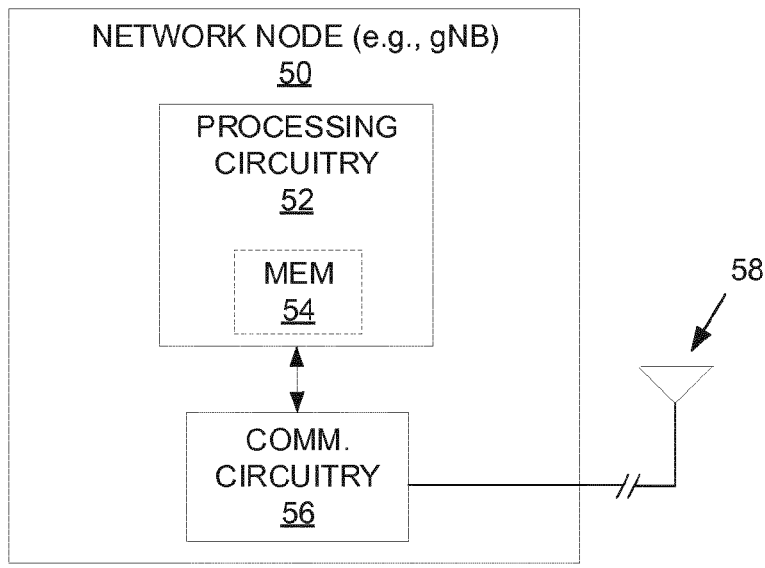
FIG. 10 is a block diagram of a network node showing hardware components.

FIG. 10 depicts a network node 50 operative in a wireless communication network. The network node 50 may be a serving node of one or more wireless devices 10, known in the art as a base station, NodeB, NB, eNB, gNB, Radio Base Station, Base Transceiver Station, Access Point, or the like. The network node 50 includes processing circuitry 52; memory 54; and communication circuitry 56 connected to one or more antennas 58, to effect wireless communication across an air interface to one or more wireless devices 10. As indicated by the broken connection to the antenna(s) 58, the antenna(s) 58 may be physically located separately from the base station 50, such as mounted on a tower, building, or the like. Although the memory 54 is depicted as being internal to the processing circuitry 52, those of skill in the art understand that the memory 54 may also be external. Those of skill in the art additionally understand that virtualization techniques allow some functions nominally executed by the processing circuitry 52 to actually be executed by other hardware, perhaps remotely located (e.g., in the so-called "cloud").

According to one embodiment of the present invention, the processing circuitry 52 is operative to cause the network node 50 to receive and process uplink control signaling from a wireless device 10. In particular, the processing circuitry 52 is operative to perform the method 200 described and claimed herein. The processing circuitry 52 in this regard may implement certain functional means, units, or modules.

Figure 11:
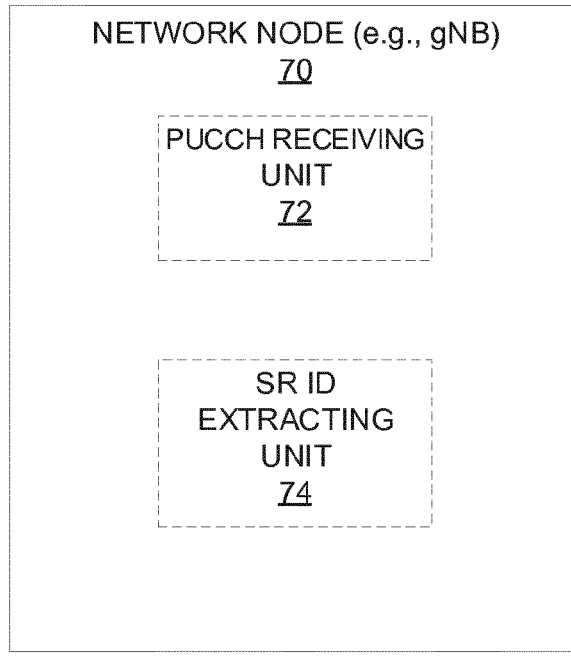
FIG. 11 is a block diagram of a network node showing functional units.
Figure 12:
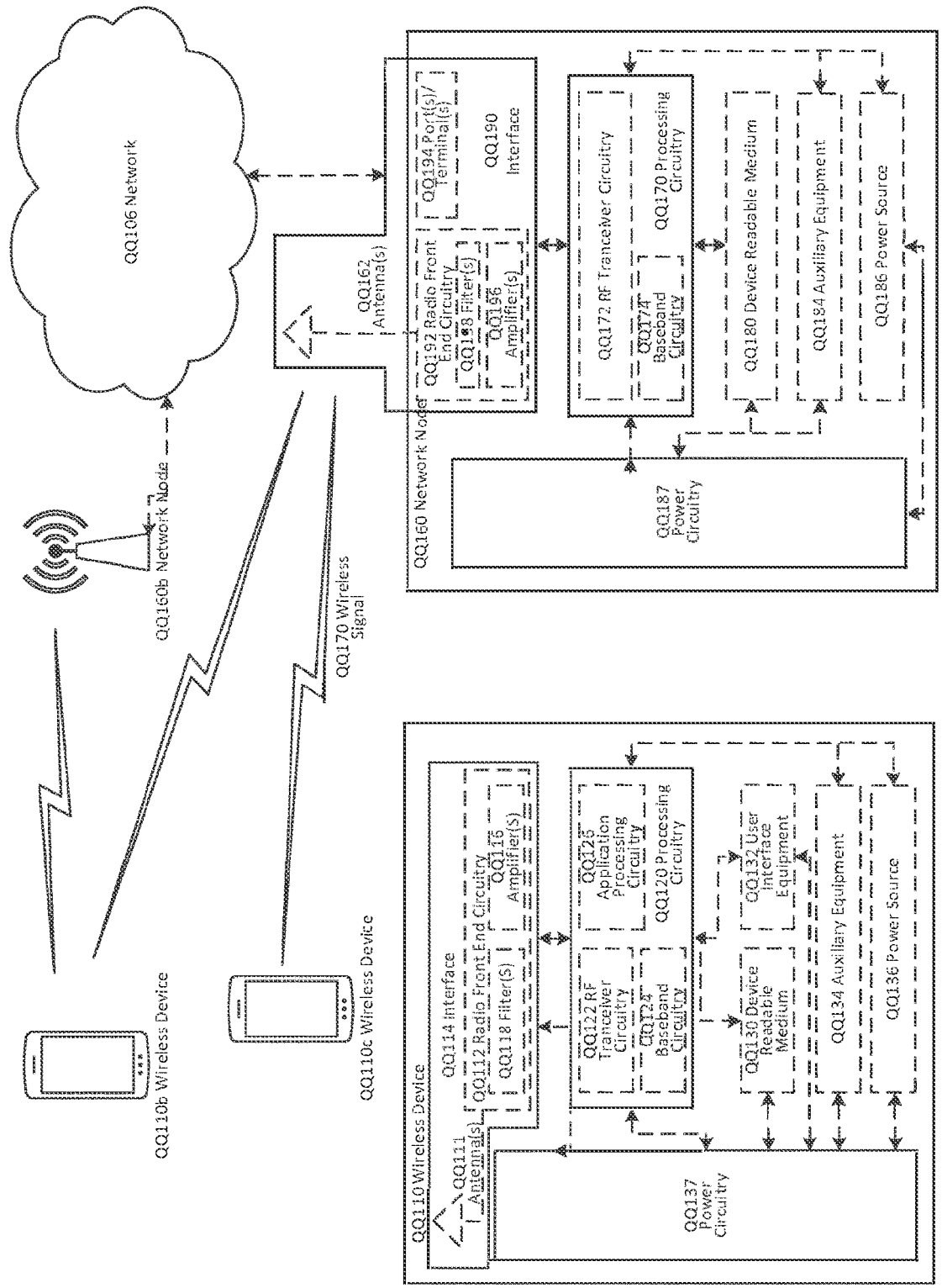
FIG. 12 is a block diagram of a network and some network components.
Figure 13:
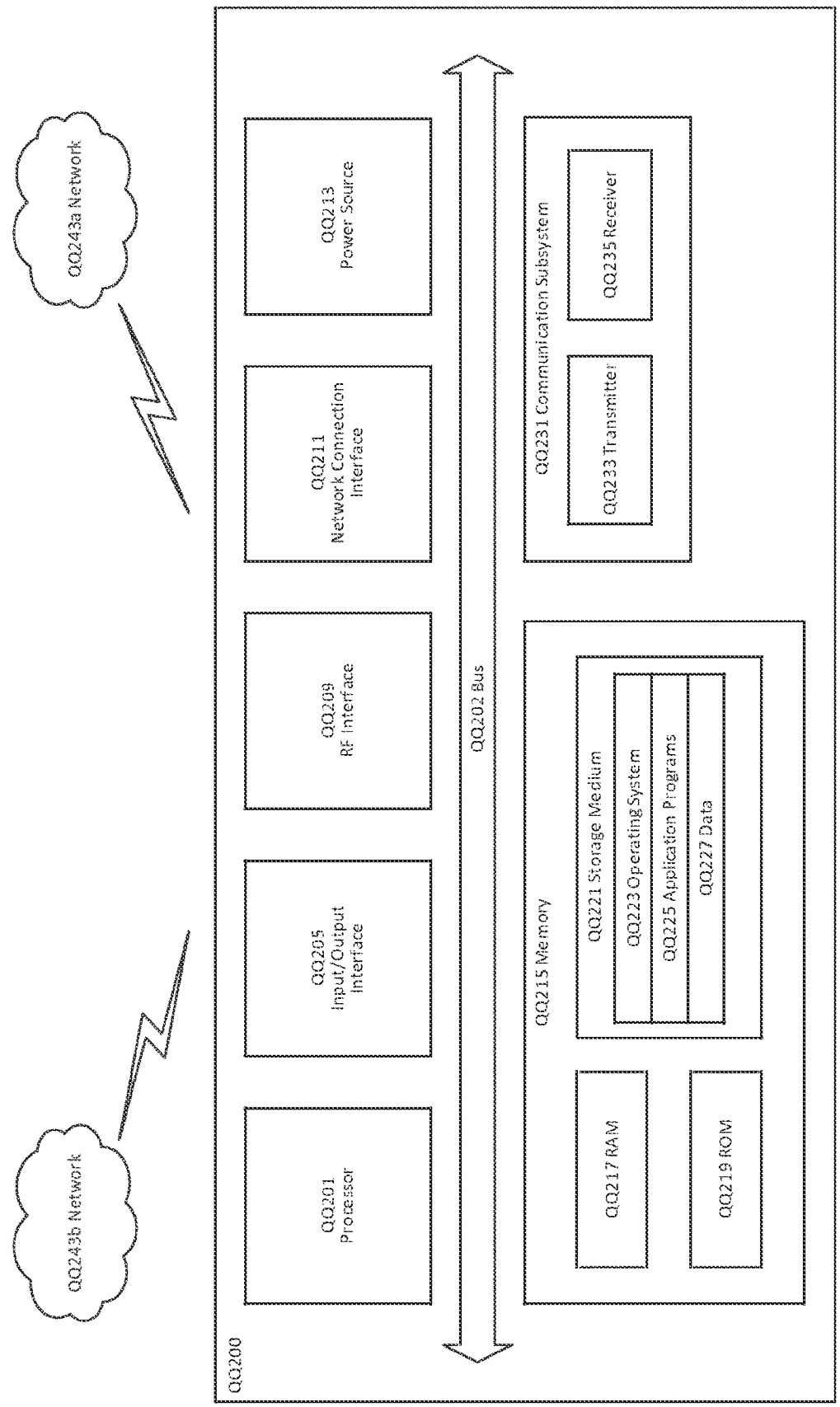
FIG. 13 is a block diagram of a User Equipment.
Figure 14:
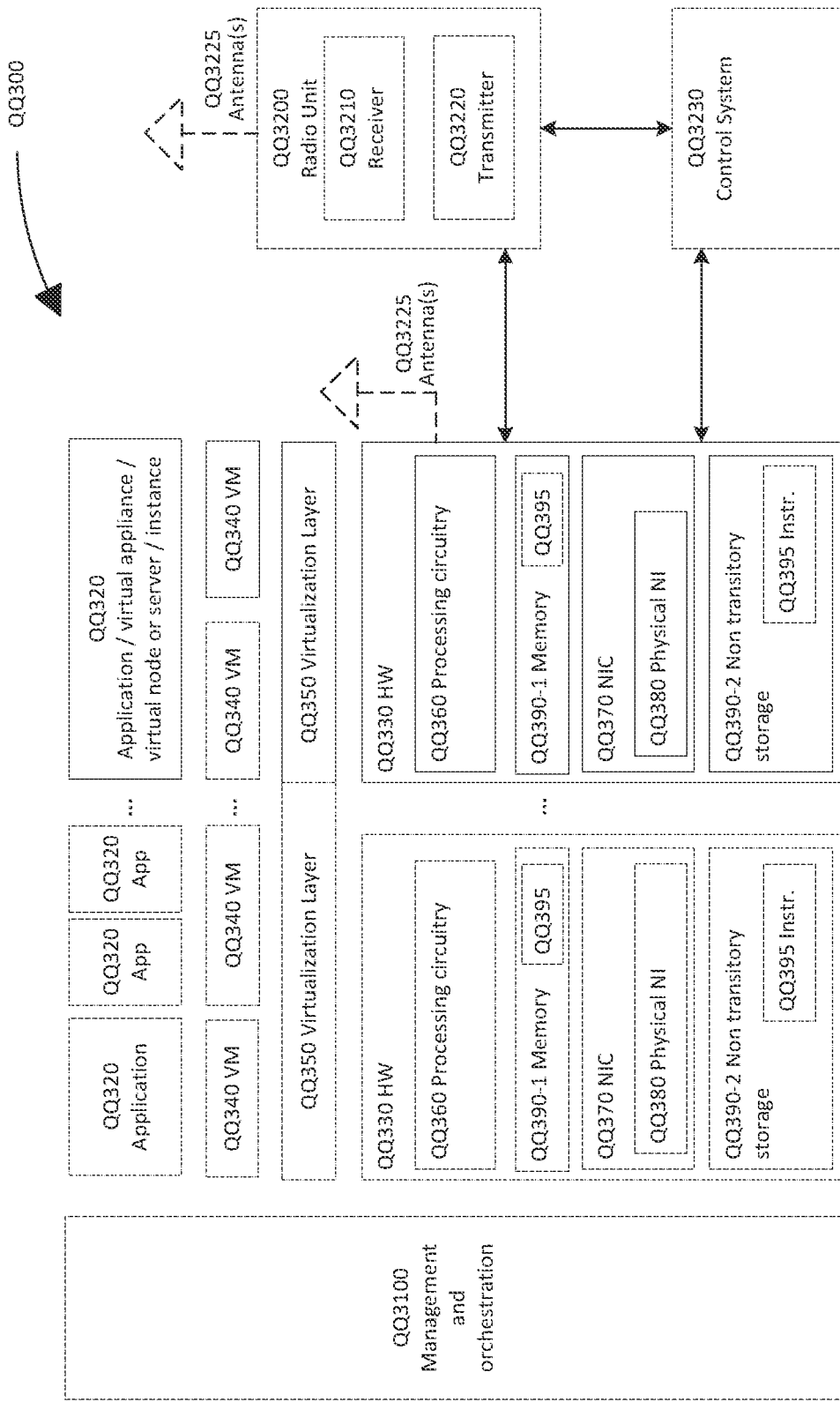
FIG. 14 is a schematic block diagram illustrating a virtualization environment.
Figure 15:
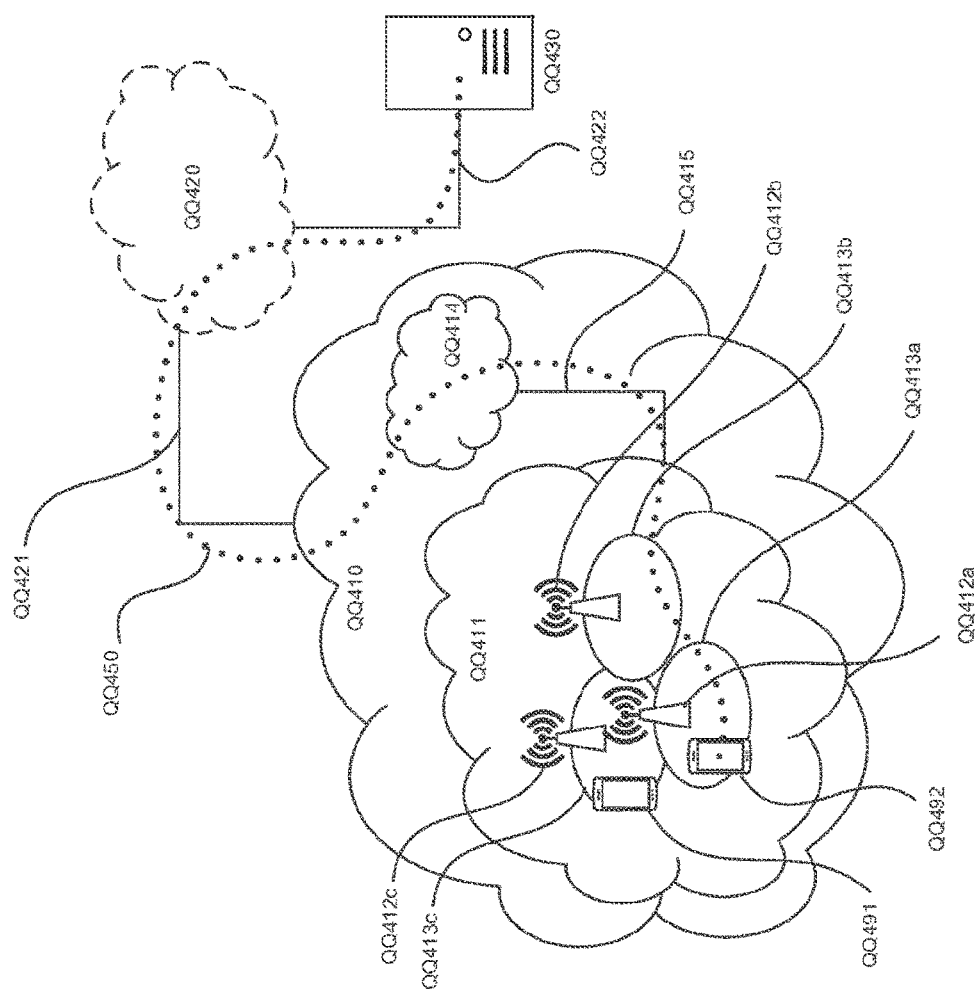
FIG. 15 illustrates a telecommunication network connected via an intermediate network to a host computer.
Figure 16:
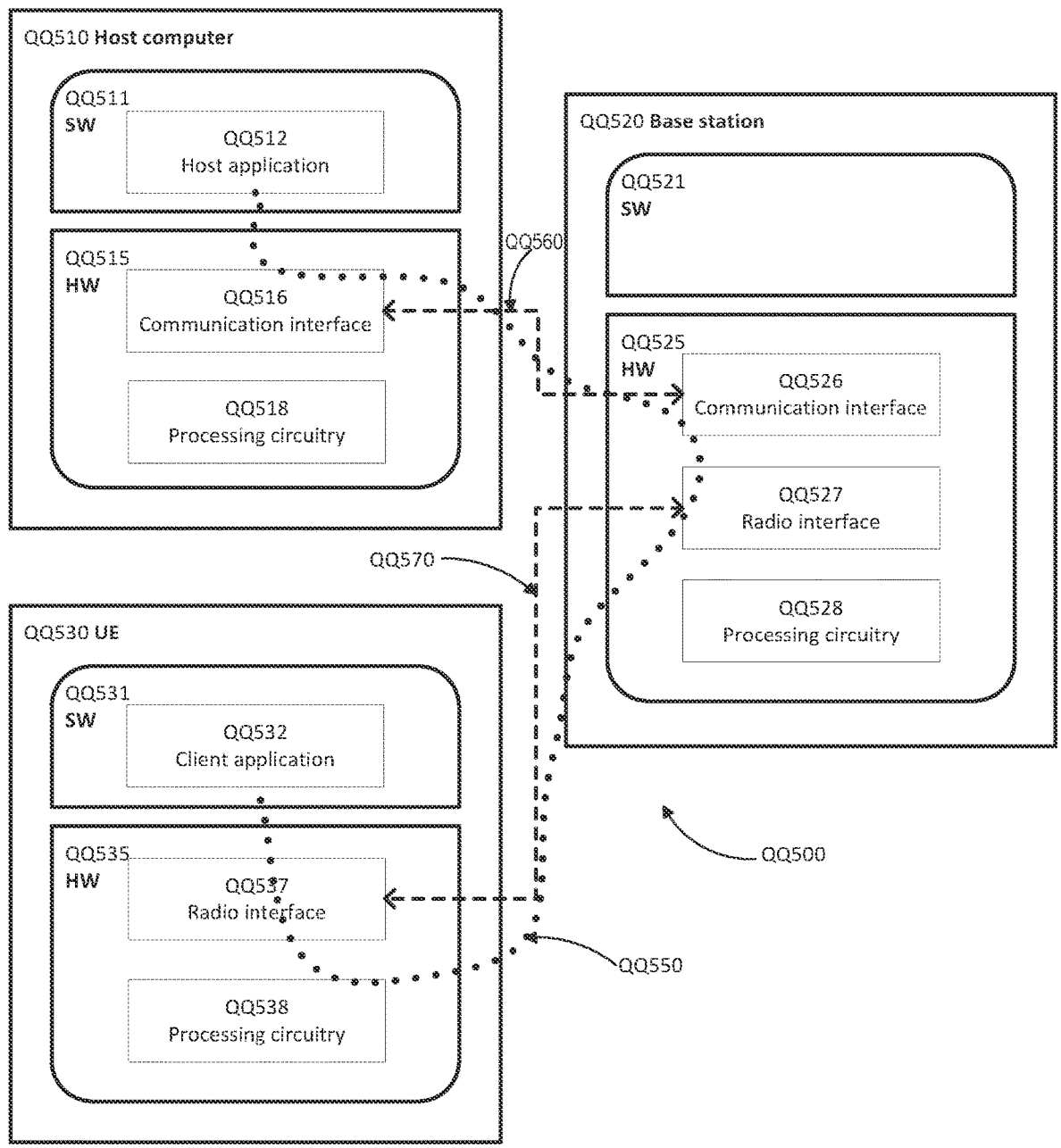
FIG. 16 illustrates host computer communicating via a base station with a user equipment over a partially wireless connection.
Figure 17:
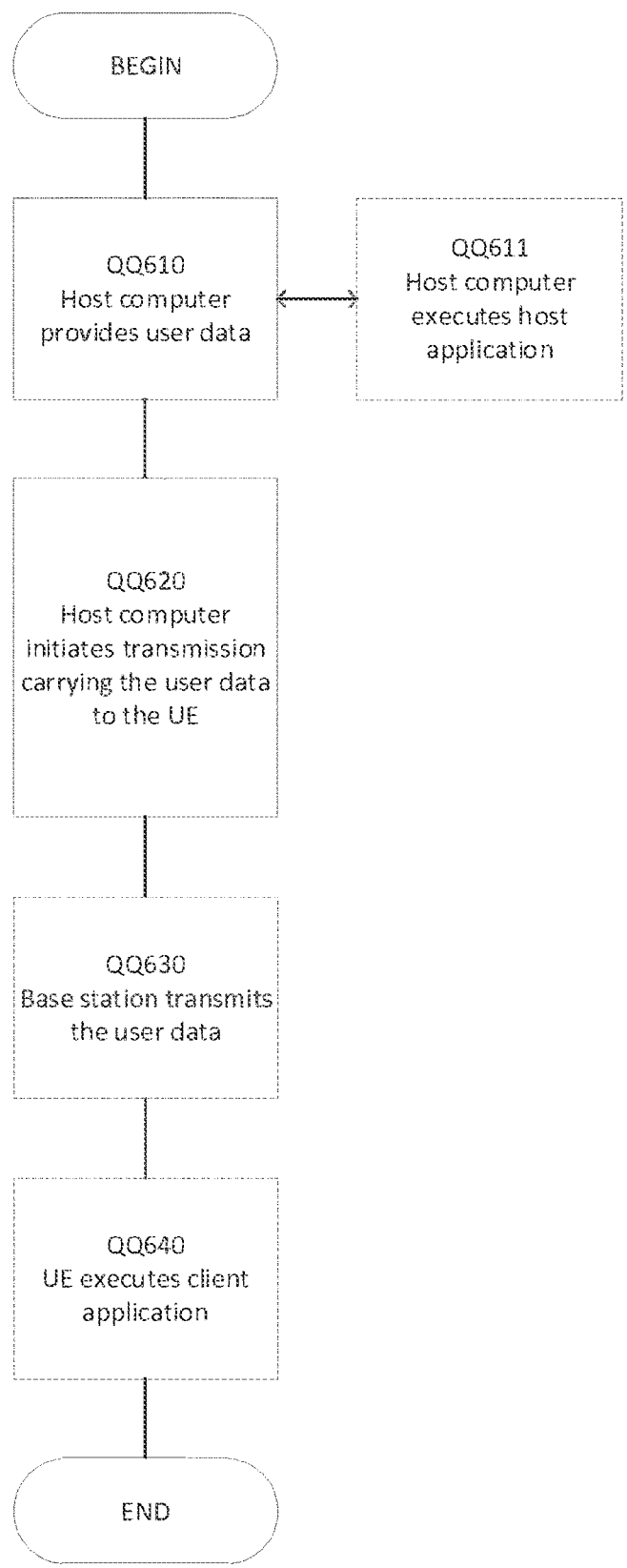
FIG. 17 is a flowchart illustrating a host computer communicating with a UE in a communication system.
Figure 18:
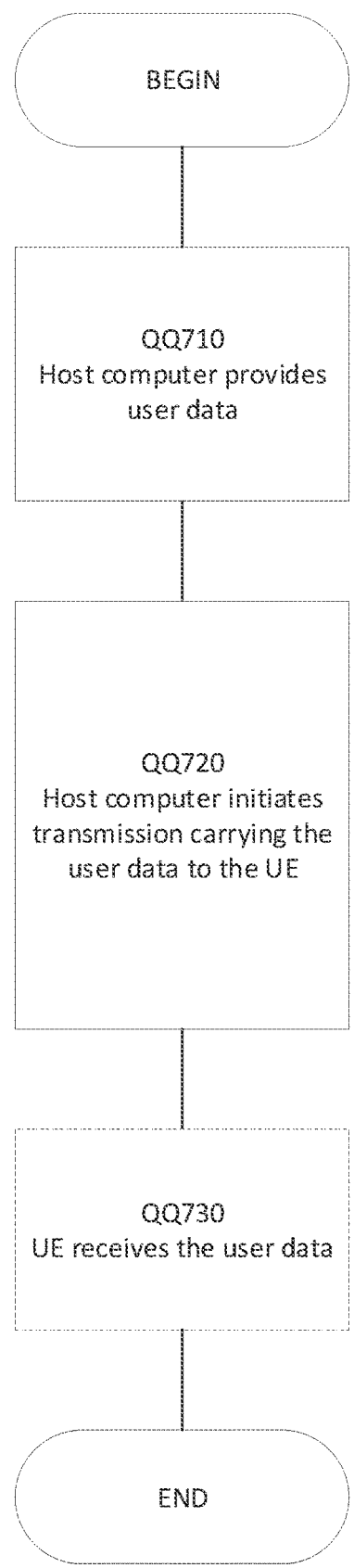
FIG. 18 is a flowchart illustrating a host computer communicating with a UE in a communication system.
Figure 19:
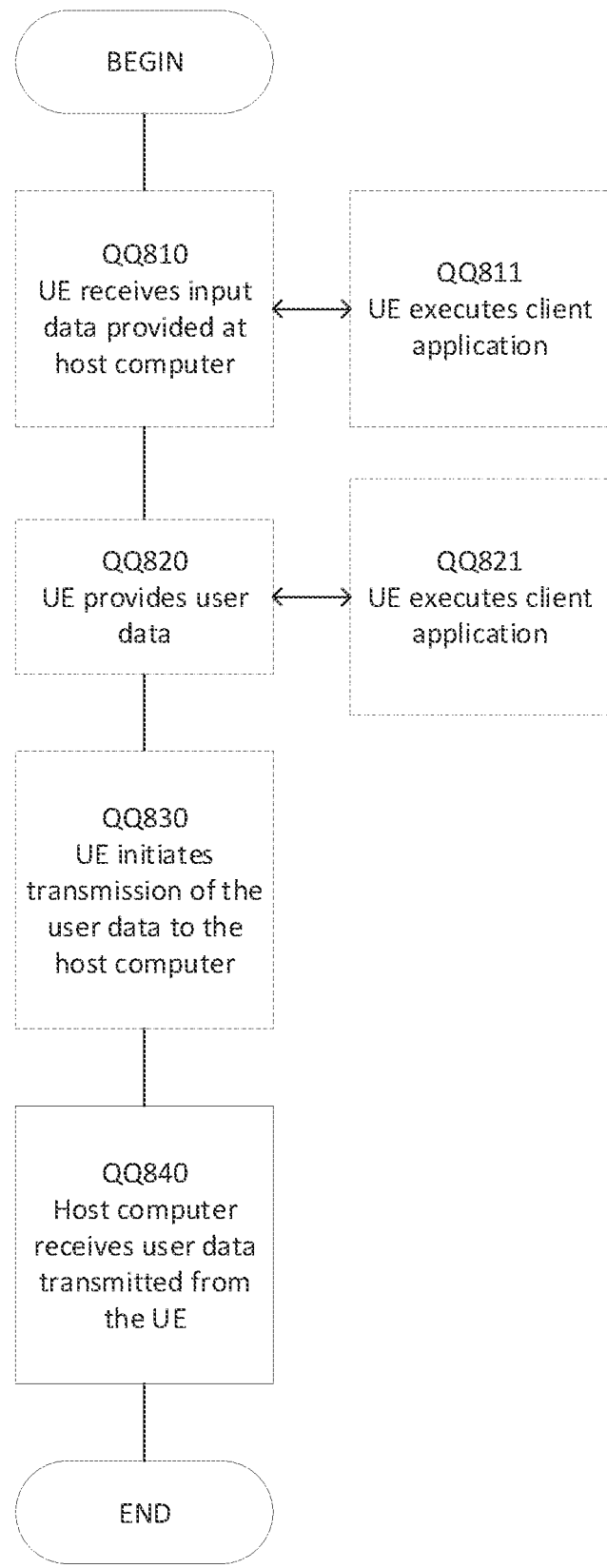
FIG. 19 is a flowchart illustrating a UE communicating with a host computer in a communication system.
Figure 20:
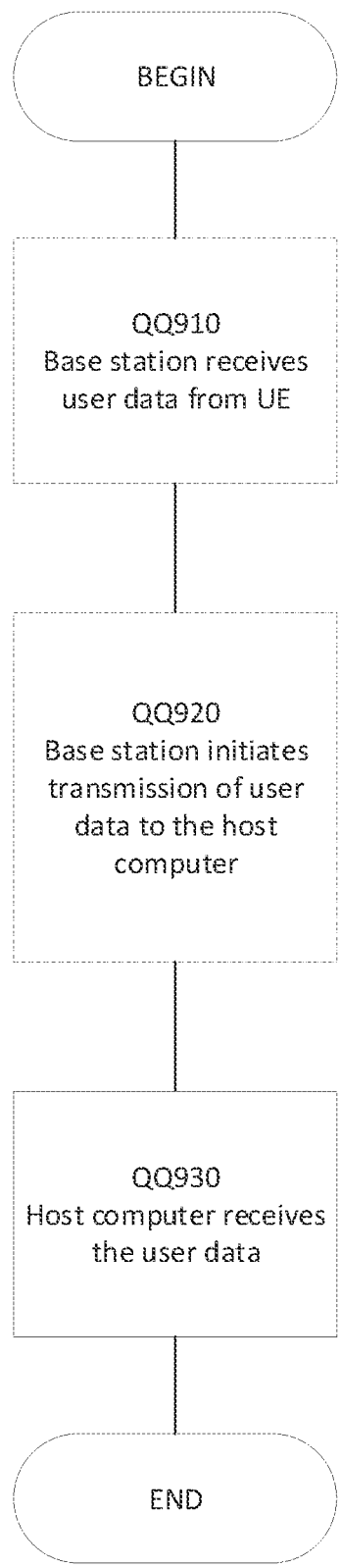
FIG. 20 is a flowchart illustrating communication between a base station and a host computer in a communication system.

FIG. 11 illustrates a schematic block diagram of a base station 70 in a wireless network according to still other embodiments. As shown, the base station 70 implements various functional means, units, or modules, e.g., via the processing circuitry 52 in FIG. 10 and/or via software code. These functional means, units, or modules, e.g., for implementing the method 200 herein, include for instance: PUCCH receiving unit 72 and SR ID extracting unit 74.

The PUCCH receiving unit 72 is configured to receive from the wireless device 10 a PUCCH transmission of UCI, including a direct indication of at least one Scheduling Request ID identifying a logical channel having data to transmit. The SR ID extracting unit 64 is configured to extract the indication of the Scheduling Request ID to identify the logical channel.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present invention provide numerous advantages over the prior art. The PHR can be selectively reported with different sizes of PH fields, and different PHR tables, based on the need and/or UE capability and/or configuration. A better flexibility is thus achieved. The PHR report is achieved with better accuracy, fitting in particular with the NR demands.

Although embodiments of the present invention are discussed herein with reference to LTE, NR, LTE-M, and NB-IoT, e.g., referring to UEs, eNB, gNB, and the like, the invention is not limited to these standardized wireless communication network protocols. Rather, embodiments of the present invention may be advantageously deployed in any wireless communication network in which power headroom or max power reporting may require large dynamic range, necessitating the use of more than one format (e.g., 6-bit and 7-bit formats). As such, those of skill in the art will understand that the claims are to be construed broadly—for example, the term "base station" encompasses any wireless network node that serves as an access point, or RAN terminal, for wireless communication with wireless devices. As used herein, the phrase "one of A and B" means the logical OR of A and B (as opposed to XOR), and is satisfied by one or more A without B, one or more B without A, or any number of A together with any number of B.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Over the Top Embodiments

Although the subject matter described herein may be implemented in any appropriate type of system using any suitable components, the embodiments disclosed herein are described in relation to a wireless network, such as the example wireless network illustrated in FIG. QQ1. For simplicity, the wireless network of FIG. QQ1 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. QQ1, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. QQ1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. QQ1 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

FIG. QQ2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. QQ2, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. QQ2 is a UE, the components discussed herein are equally applicable to a WD, and vice-versa.

In FIG. QQ2, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. QQ2, or only a subset of the components. The level of integration between the components may vary from one UE to another UE. Further, certain UEs may contain multiple instances of a component, such as multiple processors, memories, transceivers, transmitters, receivers, etc.

In FIG. QQ2, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. QQ2, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. QQ2, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. QQ3 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. QQ3, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. QQ3.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

FIG. QQ4 illustrates a telecommunication network connected via an intermediate network to a host computer in accordance with some embodiments. In particular, with reference to FIGURE QQ4, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. QQ4 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. QQ5. FIG. QQ5 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. QQ5) served by base station QQ520. Communication interface QQ526 may be configured to facilitate connection QQ560 to host computer QQ510. Connection QQ560 may be direct or it may pass through a core network (not shown in FIG. QQ5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. QQ5 may be similar or identical to host computer QQ430, one of base stations QQ412a, QQ412b, QQ412c and one of UEs QQ491, QQ492 of FIG. QQ4, respectively. This is to say, the inner workings of these entities may be as shown in FIG. QQ5 and independently, the surrounding network topology may be that of FIG. QQ4.

In FIG. QQ5, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the network access performance and thereby provide benefits such as more orderly network access when large numbers of wireless devices attempt simultaneous access, thus reducing the instantaneous processing load at the base station, and preserving battery power in the wireless devices due to decreased repeated access attempts.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. QQ6 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ6 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. QQ7 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ7 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. QQ8 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ8 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. QQ9 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ9 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following specific embodiments illustrate implementation of embodiments of the present invention in Over the Top embodiments, with reference to the claims:
Group A Embodiments include claims 1-14 and embodiment AA:
AA. The method of any of claims 1-14, further comprising:
  providing user data; and
    forwarding the user data to a host computer via the transmission to the base station.
Group B Embodiments include claims 29-42 and embodiment BB:
BB. The method of any of claims 29-42, further comprising:
  obtaining user data; and
    forwarding the user data to a host computer or a wireless device.
Group C Embodiments:
C1. A wireless device configured to perform any of the steps of any of the Group A embodiments.
C2. A wireless device comprising:
  processing circuitry configured to perform any of the steps of any of the Group A embodiments; and
  power supply circuitry configured to supply power to the wireless device.
C3. A wireless device comprising:
  processing circuitry and memory, the memory containing instructions executable by the processing circuitry whereby the wireless device is configured to perform any of the steps of any of the Group A embodiments.

C4. A user equipment (UE) comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.
C5. A computer program comprising instructions which, when executed by at least one processor of a wireless device, causes the wireless device to carry out the steps of any of the Group A embodiments.
C6. A carrier containing the computer program of embodiment C5, wherein the carrier is one of an electronic signal, optical signal, radio signal, or computer readable storage medium.
C7. A base station configured to perform any of the steps of any of the Group B embodiments.
C8. A base station comprising:
  processing circuitry configured to perform any of the steps of any of the Group B embodiments;
  power supply circuitry configured to supply power to the wireless device.
C9. A base station comprising:
  processing circuitry and memory, the memory containing instructions executable by the processing circuitry whereby the base station is configured to perform any of the steps of any of the Group B embodiments.
C10. A computer program comprising instructions which, when executed by at least one processor of a base station, causes the base station to carry out the steps of any of the Group B embodiments.
C11. A carrier containing the computer program of embodiment C10, wherein the carrier is one of an electronic signal, optical signal, radio signal, or computer readable storage medium.
Group D Embodiments:
D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.
D2. The communication system of the pervious embodiment further including the base station.
D3. The communication system of the previous 2 embodiments, further including the UE, wherein the UE is configured to communicate with the base station.
D4. The communication system of the previous 3 embodiments, wherein:
  the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method, performed by a wireless device, of uplink control signaling to a network node in a wireless communication network, the method comprising:
    triggering a Scheduling Request (SR) corresponding to a single logical channel having data to transmit;
    mapping a Scheduling Request ID that uniquely identifies only the single logical channel to one or more Physical Uplink Control Channel (PUCCH) resources;
    in response to a mapped SR PUCCH resource overlapping with a PUCCH carrying uplink control information (UCI), encoding an indication of the Scheduling Request ID directly in the UCI; and
    transmitting to the network node, on the PUCCH, the UCI including the Scheduling Request ID indication.

2. The method of claim 1 wherein the UCI transmission is on PUCCH format 2 or 3 or 4, and wherein the Scheduling Request ID comprises X bits added to the UCI transmission on PUCCH.

3. The method of claim 2 wherein the X bits comprise a bitmap of M bits, where M is the number of Scheduling Request IDs configured at the wireless device, and wherein a predetermined state of a bit in the bitmap indicates the Scheduling Request ID associated with a corresponding logical channel having data to transmit.

4. The method of claim 2 wherein X=ceil($\log_2(M+1)$) where M is the number of Scheduling Request IDs configured at the wireless device.

5. The method of claim 4 wherein, if SRs are triggered for multiple logical channels, the X bits indicate the Scheduling Request ID associated with the highest priority logical channel for which a SR is triggered.

6. The method of claim 2 wherein the X bits comprise a bitmap of L bits, where L is the number of Scheduling Request IDs configured at the wireless device for which their corresponding configured SR PUCCH resources have transmission occasions in a slot where the UCI transmission occurs, and wherein a predetermined state of a bit in the bitmap indicates the Scheduling Request ID associated with a corresponding logical channel having data to transmit.

7. The method of claim 2 wherein X=ceil($\log_2(L+1)$) where L is the number of Scheduling Request IDs configured at the wireless device for which their corresponding configured SR PUCCH resources have transmission occasions in a slot where the UCI transmission occurs.

8. The method of claim 7 wherein, if SRs are triggered for multiple logical channels, the X bits indicate the Scheduling Request ID associated with the highest priority logical channel for which a SR is triggered.

9. The method of claim 1 wherein Scheduling Request ID identifies a logical channel having a highest priority among logical channels having data to transmit, or a group of logical channels having a highest priority among groups of logical channels having data to transmit, and wherein encoding an indication of the Scheduling Request ID directly in the UCI comprises transmitting HARQ-ACK on PUCCH format 0 resource of the HARQ-ACK-only bits, where an initial cyclic shift for 2-bits is increased by $X_1$ and an initial cyclic shift for 1-bit is increased by $X_2$.

10. The method of claim 9 wherein $X_1=1$ and $X_2=3$.

11. The method of claim 1 wherein Scheduling Request ID identifies a logical channel having a second highest priority among logical channels having data to transmit, or a group of logical channels having a second highest priority among groups of logical channels having data to transmit, and the highest priority logical channel or group of logical channels, respectively, does not have data to transmit, and wherein encoding an indication of the Scheduling Request ID directly in the UCI comprises transmitting HARQ-ACK on PUCCH format 0 resource of the HARQ-ACK-only bits, where an initial cyclic shift for 2-bits is increased by $Y_1$ and an initial cyclic shift for 1-bit is increased by $Y_2$.

12. The method of claim 11 wherein $Y_1=2$ and $Y_2=4$.

13. The method of claim 1 wherein a PUCCH format is configured to only carry one bit, and wherein encoding an indication of the Scheduling Request ID directly in the UCI comprises transmitting HARQ-ACK on PUCCH format 0 resource of the HARQ-ACK-only bits using up to five cyclic shifts to indicate up to five Scheduling Request IDs or five groups of Scheduling Request IDs.

14. The method of claim 1 wherein a PUCCH format is configured to only carry one bit, and wherein encoding an indication of the Scheduling Request ID directly in the UCI comprises transmitting HARQ-ACK on PUCCH format 0 resource of the HARQ-ACK-only bits using up to three cyclic shifts to indicate up to three Scheduling Request IDs or three groups of Scheduling Request IDs by using cyclic shifts as indicated in the following table:

| Cyclic shift mcs | SR ID 0 | SR ID 1 | SR ID 2 |
| --- | --- | --- | --- |
| 1 | X | 0 | 1 |
| 2 | X | 1 | 0 |
| 3 | 1 | 0 | 0 |
| 4 | 0 | 1 | 1 |
| 5 | 1 | 1 | 1 | where SR ID 2 has the highest priority;
SR ID 0 has the lowest priority;
a '1' indicates SR has been triggered;
a '0' indicates SR has not been triggered; and
a 'X' can indicate a 1 or 0.

15. A wireless device operative to perform uplink control signaling to a network node in a wireless communication network, comprising:
    communication circuitry; and
    processing circuitry operatively connected to the communication circuitry, and adapted to
    trigger a Scheduling Request (SR) corresponding to a single logical channel having data to transmit;
    map a Scheduling Request ID that uniquely identifies only the single logical channel to one or more Physical Uplink Control Channel (PUCCH) resources;
    in response to a mapped SR PUCCH resource overlapping with a PUCCH carrying uplink control information (UCI), encode an indication of the Scheduling Request ID directly in the UCI; and
    transmit to the network node, on the PUCCH, the UCI including the Scheduling Request ID indication.

16. The wireless device of claim 15 wherein the UCI transmission is on PUCCH format 2 or 3 or 4, and wherein the Scheduling Request ID comprises X bits added to the UCI transmission on PUCCH.

17. The wireless device of claim 15 wherein a PUCCH format is configured to only carry one bit, and wherein the processing circuitry is adapted to encode an indication of the Scheduling Request ID directly in the UCI by transmitting HARQ-ACK on PUCCH format 0 resource of the HARQ-ACK-only bits using up to five cyclic shifts to indicate up to five Scheduling Request IDs or five groups of Scheduling Request IDs.

18. A method, performed by a node operative in a wireless communication network, of receiving and processing uplink control signaling from a wireless device, the method comprising:
receiving from the wireless device a Physical Uplink Control Channel (PUCCH) transmission of Uplink Control Information (UCI) including a direct indication of at least one Scheduling Request ID identifying only a single logical channel having data to transmit; and
extracting the indication of the Scheduling Request ID to identify the single logical channel.

19. The method of claim 18 wherein the UCI transmission is on PUCCH format 2 or 3 or 4, and wherein the Scheduling Request ID comprises X bits added to the UCI transmission on PUCCH.

20. The method of claim 18 wherein a PUCCH format is configured to only carry one bit, and wherein the indication of the Scheduling Request ID is encoded directly in the UCI by the wireless device transmitting HARQ-ACK on PUCCH format 0 resource of the HARQ-ACK-only bits using up to five cyclic shifts to indicate up to five Scheduling Request IDs or five groups of Scheduling Request IDs.

21. A network node operative in a wireless communication network and operative to receive and process uplink control signaling transmitted by a wireless device, comprising:
communication circuitry; and
processing circuitry operatively connected to the communication circuitry, and adapted to
receive from a mobile device a Physical Uplink Control Channel (PUCCH) transmission of Uplink Control Information (UCI) including a direct indication of at least one Scheduling Request ID identifying only a single logical channel having data to transmit; and
extract the indication of the Scheduling Request ID to identify the single logical channel.

22. The network node of claim 21 wherein the UCI transmission is on PUCCH format 2 or 3 or 4, and wherein the Scheduling Request ID comprises X bits added to the UCI transmission on PUCCH.

23. The network node of claim 21 wherein a PUCCH format is configured to only carry one bit, and wherein the indication of the Scheduling Request ID is encoded directly in the UCI by the wireless device transmitting HARQ-ACK on PUCCH format 0 resource of the HARQ-ACK-only bits using up to five cyclic shifts to indicate up to five Scheduling Request IDs or five groups of Scheduling Request IDs.

* * * * *